United States Patent [19]

Alpers et al.

[11] 4,076,040

[45] Feb. 28, 1978

[54] ALTERNATOR VALVE

[75] Inventors: Robert J. Alpers; Fredrick J. Crates; Denis P. Ott; John D. Schmunk, all of Findlay, Ohio

[73] Assignee: Hancor, Inc., Findlay, Ohio

[21] Appl. No.: 691,890

[22] Filed: Jun. 1, 1976

[51] Int. Cl.² .......................................... F16K 11/00
[52] U.S. Cl. ...................................... 137/371; 137/872
[58] Field of Search ............... 137/326, 363, 364, 368, 137/369, 371, 610

[56] References Cited

U.S. PATENT DOCUMENTS

| | | | |
|---|---|---|---|
| 1,495,858 | 5/1924 | McGinnis | 137/368 X |
| 2,893,423 | 7/1959 | Seney | 137/371 X |
| 3,943,971 | 3/1976 | Schmunk | 137/610 |
| 4,020,868 | 5/1977 | Schmunk | 137/610 |

Primary Examiner—Alan Cohan
Assistant Examiner—Gerald A. Michalsky
Attorney, Agent, or Firm—Fay & Sharpe

[57] ABSTRACT

An alternator valve assembly particularly suited for below ground level use in septic systems for diverting flow from a single inlet to either of two separate outlets. The valve is comprised of a plastic housing which defines a valve chamber having an inlet, a pair of outlets, and valve plug seat means located in the housing adjacent each outlet. A rubber valve plug is adapted to be received in the valve chamber in one of the outlets to selectively block flow therethrough. The plug includes a sealing lip cooperable with the valve seat of the associated outlet and includes an elongated handle protruding outwardly of the valve housing to facilitate movement of the plug between blocking positions with each of the outlets. An outlet box defining a hollow outlet box chamber and having an exit area may be disposed in operative communication with each of the valve housing outlets. An elongated tube-like member extends upwardly from the valve chamber housing to ground level and the elongated handle for the valve plug extends upwardly through the tube-like member to substantially ground level. A cap or cover is closely received in or over the tube-like member at ground level. The elongated handle is longitudinally dimensioned to cooperate with the inner face of the cap or cover to prevent undesired dislodgement of the valve plug from blocking engagement with one of the valve chamber outlets due to system back pressures or the like.

16 Claims, 8 Drawing Figures

ALTERNATOR VALVE

BACKGROUND OF THE INVENTION

1. Field of Invention

The subject invention is directed toward the art of valves and more particularly to valves for controlling fluid flow between a plurality of valve outlets.

The invention is particularly applicable to an alternator valve for use in septic systems to control flow of septic tank effluent between a plurality of septic leach beds and will be described with particular reference thereto; however, it will be appreciated by those skilled in the art that the invention has broader applications and could be advantageously employed in a variety of other environments.

The invention is related to and an improvement of the invention disclosed in the commonly assigned application Ser. No. 630,984, filed Nov. 12, 1975 and now issued as U.S. Pat. No. 4,020,868.

2. Prior Art

Because of soil conditions as well as other environmental and practical factors, it is sometimes desirable in septic tank systems to provide each septic tank with at least two separate leach beds or drain fields. With such an arrangement, the effluent from the tank can then be alternated between the various beds at periodic intervals. Such action allows the leach beds to, in effect, revitalize or rejuvenate themselves during the periods of non-use.

Accordingly, it has been deemed advantageous to provide a valve useful in performing a diverting or alternating function to achieve these desired results. Such a valve must be capable of withstanding relatively adverse operating conditions over long periods of time. Moreover, if the valve is to be economically compatible with typical septic arrangements or systems, it must be available in rather large sizes at relatively low cost. Further, such valves are preferably light weight and designed so as to require little or no maintenance over long periods of time. A prior valve which was designed to meet these requirements is shown in the commonly assigned U.S. patent application having Ser. No. 461,389 filed Apr. 16, 1974 and now issued as U.S. Pat. No. 3,943,971.

The subject invention provides a new and improved structure which meets these requirements and others and which provides a new and improved alternator valve which is simple, economical, reliable and readily adaptable to use in a number of different environments.

BRIEF DESCRIPTION OF THE INVENTION

In accordance with the present invention, there is provided an alternative valve adapted to be installed below ground and comprised of a housing having a continuous side wall, a bottom wall, and a top wall defining a hollow valve chamber. The chamber has an inlet opening and the bottom wall includes at least two spaced apart outlet openings with both the inlet and outlets communicating from outside the housing with the chamber. The housing top wall has a valve plug receiving opening therein and each outlet includes a valve plug seat area disposed adjacent thereto. A valve plug is receivable in the chamber through the plug receiving opening and is movable through that opening between separate spaced blocking positions with the outlets in order to selectively block at least one of the outlets while allowing communication through the chamber between the inlet and the other of the outlets. The valve plug is comprised of a resilient body member having a plug portion dimensioned to be loosely received in the outlets and a sealing area adapted to engage the seat area of the associated outlet. The valve plug further includes an elongated handle portion extending outwardly thereof and dimensioned to extend outwardly from the valve housing through the plug receiving opening when the plug is in an outlet blocking position. The elongated handle is longitudinally dimensioned to extend substantially to ground level in order that the valve plug may be moved while maintaining an agreeable distance from the effluent in the valve chamber. A cover is provided in or over the handle and opening in the ground leading to the alternator valve itself. This cover and the outermost end of the handle are in cooperative engagement with each other to thereby assure that the valve plug will remain in position.

In accordance with another aspect of the present invention, the sealing area on the valve plug comprises an outwardly protruding flexible sealing lip cooperable with the seat area of the associated outlet. The sealing lip is flexed by the weight of the valve plug itself and retained in that position by cooperation between the handle and cover in order to provide high pressure sealing.

In accordance with still another aspect of the present invention, the cover includes means for receiving at least the outermost end of the valve plug handle.

In accordance with a more limited aspect of the invention, a tube-like member extends from the valve housing to ground level with the valve plug handle disposed therein. The cap or cover is closely received in or on the uppermost end of the tube-like member.

There are distinct advantages to the present invention. They include the provision of a new and improved alternator valve which is simple in design, easy to manufacture and reliable. Another advantage of the present invention is the provision of an alternator valve which may be conveniently formed from plastic and rubber materials by conventional molding and forming techniques. Still another advantage of the present invention is the provision of an alternating valve which has a minimum number of individual components, which can be manufactured rapidly and economically and which can be operated from the surface after installation. A still further advantage is the provision of an alternator valve in which the valve plug is effectively locked in position to prevent dislodgment thereof due to system back pressures and the like.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 7 is a view similar to FIG. 6 showing an alternative arrangement for the cover; and, FIG. 8 is a plan view of modified cover showing a hinged interconnection between the cover and upper edge of the tube-like member extending upwardly from the alternative valve to ground level.

DESCRIPTION OF THE PREFERRED EMBODIMENT

Referring now to the drawings wherein the showings are for purposes of illustrating the preferred embodiment of the invention only and not for purposes of limiting same, the FIGURES show an alternator valve structure A communicating with a pair of outlet boxes B. The valve and outlet boxes are disposed beneath ground level 10 with the outlet boxes being supported on a concrete pad or base 12.

More particularly, the alternator valve is comprised of a housing 20 having a continuous side wall 22, a bottom wall 24 and a top wall 26. Disposed in side wall 22 is an inlet opening 28 and disposed in bottom wall 24 are a pair of spaced apart outlet openings 30, 32. Additional outlets could be provided. In the preferred embodiment, these two outlets are identical to each other. Top wall 26 includes an enlarged valve plug receiving opening 34, the intent and purpose of which will be described in greater detail hereinbelow. The housing structure just described defines a hollow valve chamber which readily facilitates effluent flow therethrough.

Inlet opening 28 has an outwardly extending hollow cylindrical sleeve or collar member 42 which includes an inwardly facing generally U-shaped groove 44 therein. A soft pliable O-ring seal 46 is received in groove 44 for reasons which will become apparent hereinafter. Each outlet 30, 32 also includes a cylindrical sleeve or collar member 48 extending outwardly therefrom. These members taper slightly inwardly from adjacent bottom wall 24 toward the outer end for ease of assembly as will be described hereinafter. Top wall 26 includes an upstanding edge 50 extending peripherally around valve plug receiving opening 34. Bottom wall 24 includes a seat area 52 around each outlet opening 30, 32 adjacent the intersection of sleeve or collar members 48 and bottom wall 24. In the preferred arrangement here under discussion, seat areas 52 merely comprise a portion of the bottom wall itself. However, other seat area configurations could be employed without departing from the intent and scope of the invention.

Housing 20 is preferably formed from a suitable plastic material such as high density polyethylene, polyvinyl chloride or the like. The entire housing is also preferably formed by conventional blow molding techniques as will be appreciated to those skilled in the art.

Figure 1:
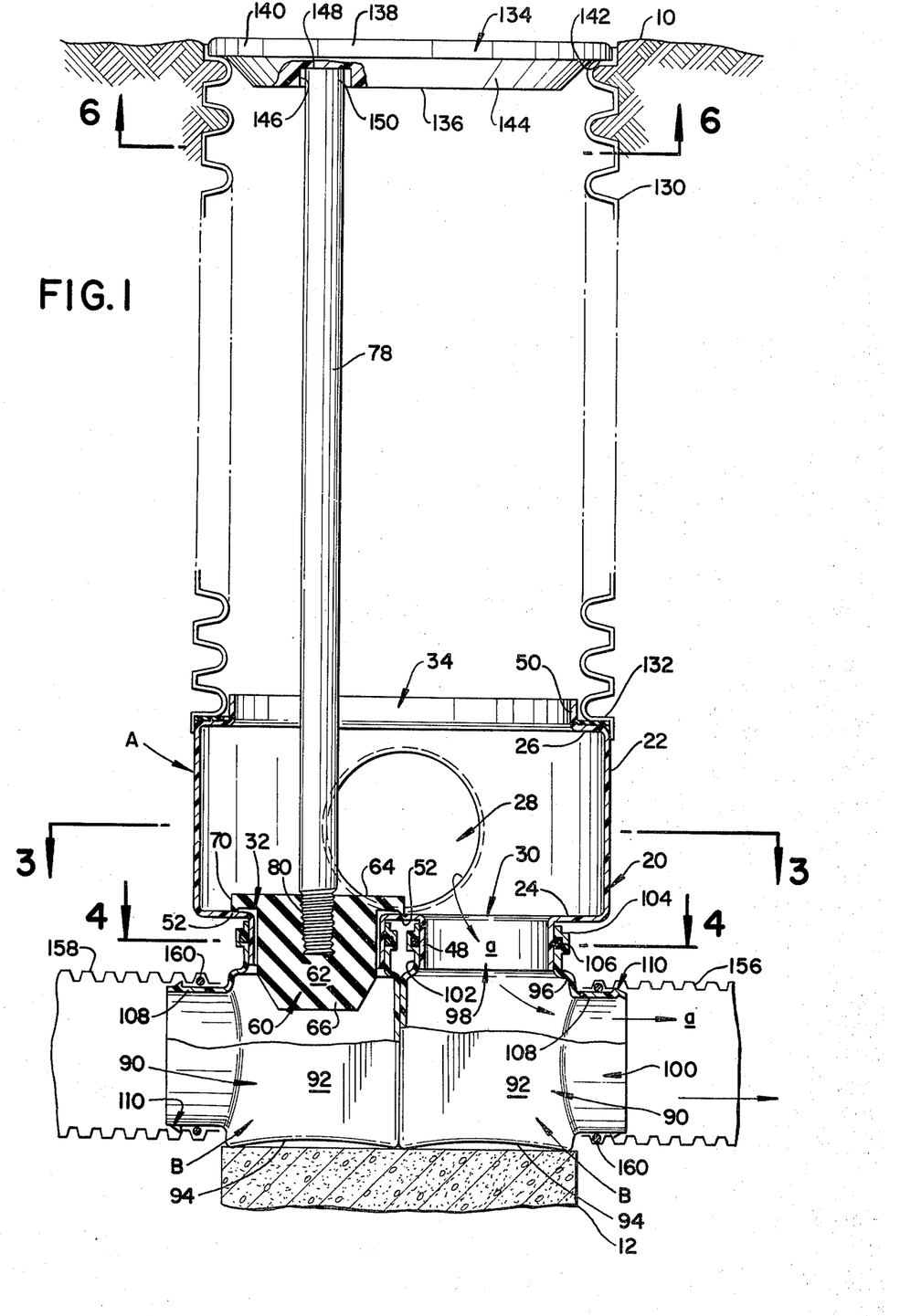
FIG. 1 is a front elevational view in partial cross-section of the subject alternator valve arrangement as installed in a typical operational environment.
Figure 5:
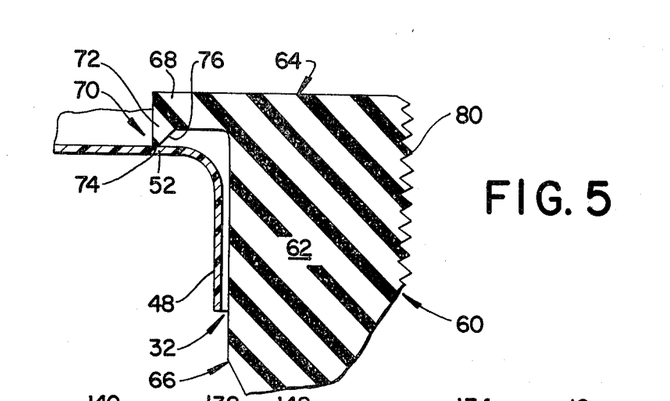
FIG. 5 is an enlarged partial view showing a portion of the cooperation between the valve plug sealing area and the valve housing seat area.

The alternator valve includes a valve plug generally designated 60 which is receivable in either of outlet openings 30, 32 for purposes of blocking fluid or material flow therethrough. This valve plug includes a plug portion 62 having an inner end portion 64 and an outer end portion 66. The outer end portion is conveniently tapered to facilitate ease of installation of the plug into the outlets themselves. With particular reference to FIGS. 1 and 5, it will be seen that inner end portion 64 comprises an enlarged flange area generally designated 68 having a cross-sectional dimension greater than the cross-sectional dimensions of outlet openings 30, 32. Flange 68 includes a sealing area thereon generally designated 70 which is comprised of an outwardly protruding lip 72. This lip extends outwardly from flange 68 in the same direction as plug portion 62 and includes a sealing surface 74 disposed at the distal end thereof. In the preferred arrangement, lip 73 has a width of approximately 1/32 inches.

The rear edge 76 of the lip tapers outwardly from sealing surface 74 toward flange 68 at a preferred angle of 45° relative to the longitudinal axis of the valve plug itself. The dimensional relationship between the valve plug and housing is such that sealing surface 74 will engage seat area 52 of the associated outlet 30 or 32 when the valve plug is placed thereinto. The cross-sectional dimension of plug portion 62 is less than and fits freely into either of outlet openings 30, 32. Valve plug 60 is preferably constructed from rubber of a composition having a low durometer rating. Of course, other materials or compositions could be advantageously employed without departing from the concepts of the subject invention.

Extending outwardly from inner end portion 64 of the valve plug is an elongated handle 78 which is preferably dimensioned to extend outwardly a fairly precise distance from housing 20 through valve plug receiving opening 34. This arrangement facilitates ease of valve manipulation through that opening and locking of the valve plug in position for reasons to be described in greater detail hereinafter. In the preferred arrangement of the present invention, handle 78 is constructed from hardwood and is threadedly affixed to valve plug 60 at threaded area 80. However, it should be readily appreciated that the handle could also be formed from other materials and take other configurations.

Associated with each of outlet openings 30, 32 is an outlet box B. In the preferred embodiment, each of these boxes is identical to the other so description will hereinafter be made with reference to one, it being appreciated that the other is identical thereto unless otherwise specifically noted. Accordingly, each outlet box is comprised of an outlet box housing generally designated 90 having a continuous side wall 92, a bottom wall 94 and a top wall 96 which defines a hollow outlet box chamber. Disposed in the top wall is an entrance area 98 and disposed in the side wall is an exit area 100.

Entrance area 98 includes an outwardly protruding hollow cylindrical sleeve or collar 102 having an inwardly facing generally U-shaped groove 104 therein. Disposed in this groove is a soft resilient O-ring seal, the purpose of which will be described in greater detail hereinafter. Protruding outwardly from exit area 100 is another hollow cylindrical sleeve or collar member 108 which conveniently includes tube locking means generally designated 100 therein. In the preferred arrangement, these locking means are of the type illustrated in the commonly assigned U.S. Pat. No. 3,695,643 and facilitates exit area 100 being directly connected to conventional corrugated tubing of the type currently most often used for septic leach bed systems. It should be appreciated, however, that the particular form of connecting means 110 provided forms no part of the present invention and other joint structures or connecting means could be advantageously employed. In addition to locking means 110, convenient sealing means are provided between the inside of the corrugated tubing and outside of sleeve or collar member 108 to establish a fluid-tight relationship between them. The specifics of such means will be discussed in greater detail hereinafter.

Figure 2:
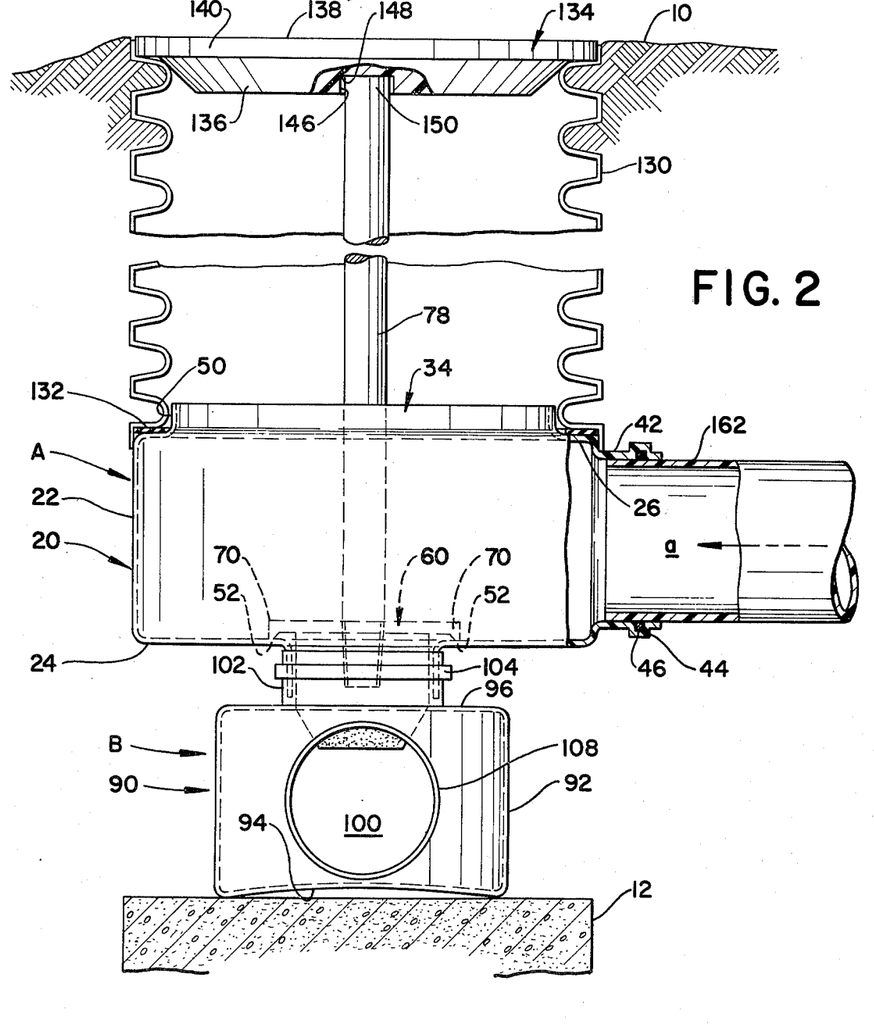
FIG. 2 is a side elevational view in partial cross-section of the arrangement shown in FIG. 1.

As best shown in FIGS. 1 and 2, bottom wall 94 is preferably slightly concave which defines a rim-like area around the periphery of the bottom wall to help insure stability of the overall structure when it rests on the upper surface of concrete pad or base 12. While the amount or degree of concave may vary as desired or necessary, the preferred embodiment contemplates that it will be approximately ⅛ inches at its maximum. Further, cylindrical sleeve or collar member 108 is tapered slightly inward from adjacent side wall 92 toward the outermost end thereof for ease of assembly.

As with valve housing 20, outlet box housing 90 is preferably formed from a suitable plastic material such as high density polyethylene, polyvinyl chloride or the like. The outlet box housing is also preferably formed by conventional blow molding techniques.

In the environment shown in FIGS. 1 and 2, alternator valve A is arranged to control flow entering inlet opening 28 between either of the two separate outlet openings 30, 32. The alternator valve and outlet boxes are normally buried beneath ground level 10 and bottom walls 94 of the outlet boxes rest upon the top surface of pad or base 12. The outlet boxes are dimensioned and configured such that they are placed in a closely spaced back to back position when the valve housing is installed thereon. As noted above, the concave nature of bottom walls 94 are such to aid in providing stability for the overall structure.

Cylindrical sleeve or collar members 48 associated with outlet openings 30,32 and cylindrical sleeve or collar members 102 of entrance areas 98 in the outlet boxes are dimensioned so that members 48 will be closely received in members 102. The slight taper on members 48 allows this assembly and O-ring seals 46 assure an adequate sealing relationship between these components.

An access opening to the valve structure is conveniently provided through means of an elongated piece of smooth walled or corrugated plastic tubing. As shown in the drawings, corrugated tubing identified by numeral 130 is employed and which is sized to surround valve plug receiving opening 34 on the outside of upstanding edge or frange 50. A gasket 132, preferably of foam rubber, is disposed between the end of plastic tubing 130 and valve housing 20 where the two components meet. A cap or cover generally designated 134 is conveniently provided for covering the access opening at ground level 10 to prevent dirt and other material from entering the opening and to prevent damage to the valve itself. Moreover, the cover is designed to positively cooperate with the hand 78 in order to maintain the valve plug in position with the valve in a manner and for reasons to be described in detail hereinafter.

Figure 6:
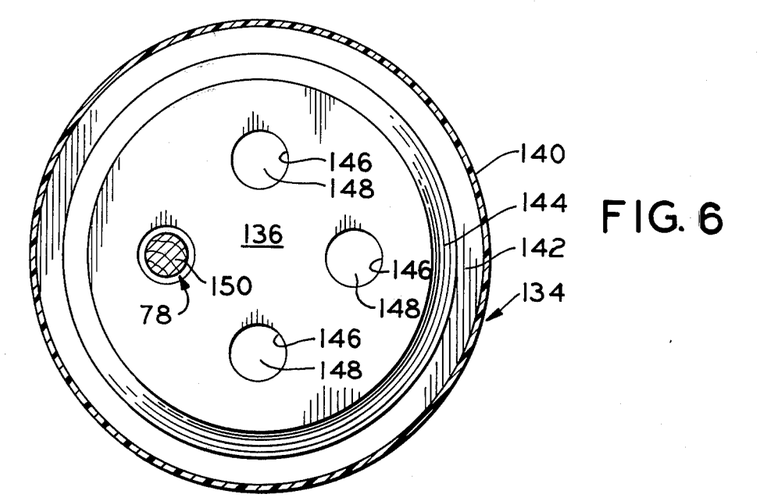
FIG. 6 is a cross-sectional view taken along lines 6—6 of FIG. 5 showing an assembly cover.

More particularly and with reference to FIGS. 1 and 6, cap or cover 134 has opposed generally flat inner and outer faces 136,138 and an outer peripheral wall 140. The cover is circular and has a diameter which allows it to be closely received in one of the corrugations of tubing 130 with a cover ledge area 142 resting on a corrugation and peripheral wall 140 closely spaced to the inside wall thereof. A close fitting relationship is preferred in order to retain the cover in position for reasons which will become apparent hereinafter. A converging peripheral lead-in area 144 is disposed between ledge area 142 and inner face 136.

Inner face 136 includes a plurality of inwardly extending holes or openings 146 with each opening having a bottom wall 148. These openings have a cross-sectional dimension slightly greater than the cross-sectional dimension of handle 78 in order that the outermost end of the handle may be received therein. The openings themselves are symetrically located in inner face 136 in a manner so that any one of them may be selectively coaxially aligned with handle 78 when valve plug 60 is disposed in a blocking position in either one of outlet openings 30, 32. This is made possible by the fact that openings 30, 32 are themselves symetrically disposed in housing 20.

Cover 134 may be constructed from any number of convenient and different materials. Openings 146 may, in some instances, be integrally formed in the cover and, in other instances, may be machined therein. In the preferred arrangement here under discussion, cover 134 is constructed from high density polyethylene, polyvinyl chloride or the like using conventional molding techniques. While four openings 146 have been shown in FIG. 6, a greater or lesser number may be satisfactorily employed since only one such opening is actually required because the cover itself may be easily located relative to the particular position of the valve plug in the valve itself. A greater number of openings simply makes it easier to align the cover with regard to the valve plug handle. Also, the configuration of openings 146 may be varied from that specifically shown in FIGS. 1 and 6 to simple recessed areas without departing from the intent and scope of the invention. For example, dimpled hemispherical areas could be advantageously employed.

Typically, the distance from the top of sleeve or collar member 42 in the valve housing to ground level 10 is approximately 20 inches although this distance may be varied as deemed necessary and appropriate. The length of handle 78 is then made such that when the valve plug is received in blocking position with one of outlet openings 30, 32, the handle protrudes upwardly through valve plug receiving opening 34 to a position closely associated with inner face 136 of cover 134 so that outermost end 150 thereof is received in one of openings 142. This arrangement assures that the valve plug will be retained in position within one of outlet openings 30,32 so that it may not be unknowingly and undesirably dislodged. Such dislodgment is normally caused by back pressures and the like occurring in the very system in which the valve is installed. Moreover, and by merely removing cover 134 from tubing 130, handle 78 facilitates easy and convenient movement of valve plug 60 from a blocking position with one of outlet openings 30, 32 to a blocking position with the other opening.

Figure 3:
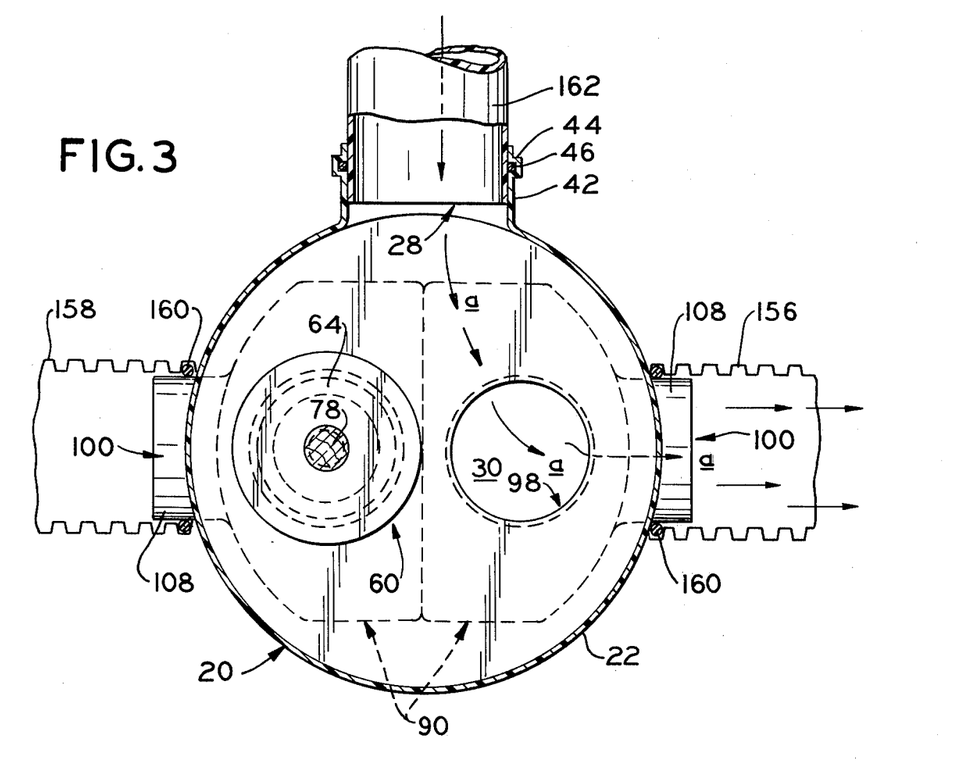
FIG. 3 is a cross-sectional view taken along lines 3—3 of FIG. 1.
Figure 4:
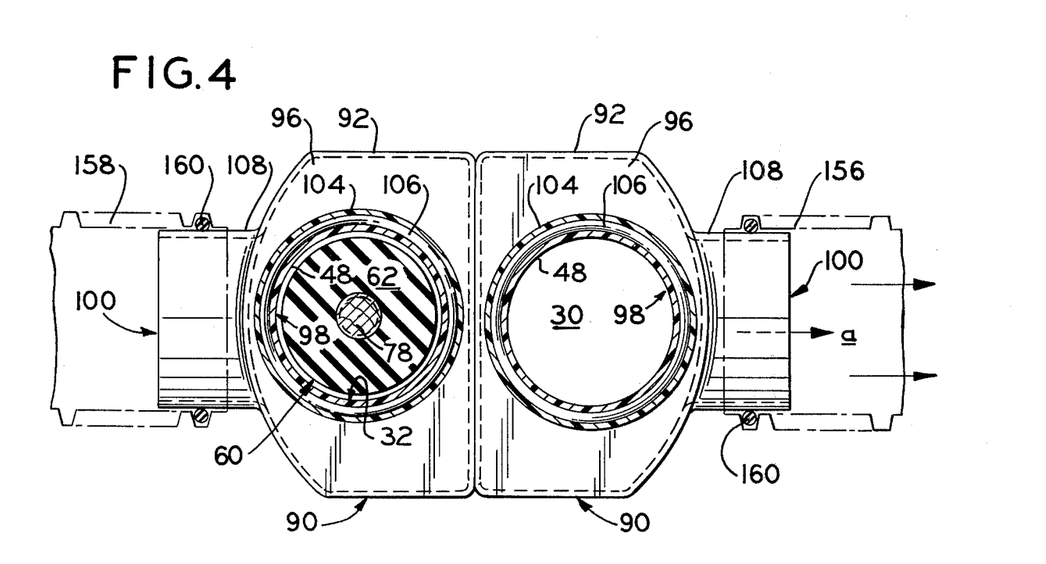
FIG. 4 is a cross-sectional view taken along lines 4—4 of FIG. 1 with the valve plug removed for ease of illustration.

In the preferred embodiment here under discussion, conventional corrugated plastic tubing is employed for outlet lines 156,158. These lines are affixed to exit areas 100 of the two outlet boxes B by, for example, the convenient means 1-0 noted above. As shown in FIGS. 1, 3 and 4, O-ring seals 160 are conveniently closely received in the first corrugations of each of outlet lines 156,158 and sealingly engage the outside surface of the associated sleeve or collar member 108 to establish a fluid-tight seal between the interfitting components involved. O-ring seals 160 may advantageously by comprised of a soft pliable material. Other types of sealing materials and arrangements could also be employed for sealing the outlet lines without departing from the intent and scope of the subject invention. For example, it is also possible to employ smooth walled tubing for outlet lines 156,158; however, a special adaptor is normally required to affix such smooth walled tubing to the outlet boxes themselves. In any event, outlet lines 156,158 extend from the outlet boxes B to the separate or individual leach beds. An inlet line 162 directs effluent from the septic tank itself into inlet opening 28 of housing 20. Cylindrical sleeve or collar member 42 is sized so as to closely receive the end of inlet line 162 with O-ring seal 46 closely embracing the side wall of the inlet line.

In the arrangement shown in the FIGURES, valve plug 60 is in a blocking relationship with outlet opening 32 so that effluent flow from a septic tank (not shown) through inlet tube 162 will pass through the valve chamber out of outlet opening 30 and into the outlet box associated therewith. From there, the effluent passes outwardly of the outlet box by means of exit area 100 through outlet line 156 to the associated leach bed as shown by the arrows designated a in the drawings themselves. Because of the enlarged hollow chambers defined by housing 20 and 90, effluent passing through the valve and outlet boxes will not have a tendency to build up or clog the chambers.

The particular structure for valve plug 60 described hereinabove is deemed to provide a particularly simple, efficient and reliable seal to assure that effluent flow will be blocked from passing through outlet opening 32. In this regard, attention is again directed to both FIGS. 1 and 5 for the specific details thereof. The valve plug may, of course, be easily moved within the valve chamber by means of handle 78 and does not comprise a force fit type of seal normally associated with plug type sealing elements. Rather, plug portion 62 is dimensioned to be loosely received in the sleeve or collar member 48 associated with each of outlet openings 30, 32 and the entire sealing function is performed by sealing area 70 cooperating with seat area 52.

Sealing surface 74 of outwardly protruding lip 72 contacts the seat area and, because of the low durometer rating of the rubber valve plug, this lip may be resiliently deformed to assure good contact with the seat area even though the seat area of inner surface of bottom wall 24 might be rough or irregular. The sealing contact is thus comprised of a small band or area extending peripherally around the valve plug itself plus the weight of handle 78 which, together, act as a compressive force to force the lip into a positive sealing position. As noted above, the preferred width of sealing surface 74 is approximately 1/32inches and, in typical environments, the total gravity weight of valve plug 60 plus handle 78 is approximately 4 pounds. Due to the dimensional characteristics of the plug, the concentrated force on the sealing surface is approximately 8 pounds per square inch which has been found to be totally adequate to assure positive sealing in the absence of any system back pressures or the like occuring in the preferred environment of use.

However, many systems with which the subject invention may be employed, such as septic systems, have back pressures operating therein in a direction opposite to the normal flow of effluent therethrough. In some instances, these back pressures are sufficient to overcome the combined weight of the valve plug and handle to thereby force sealing surface 74 of tip 72 away from 52 to break the seal arrangement. In other instances and under elevated back pressures, the valve plug could be completely forced out of its associated valve outlet opening. In either situation the valve plug would no longer perform its intended outlet blocking function so that the alternator valve could not function in the intended manner. To eliminate this problem and provide additional positive sealing, end 150 of handle 78 is closely spaced to bottom wall 148 of an associated opening or bore 146 in cap or cover 134 when the cover is closely positioned in tubing 130 with the valve plug in a normal sealing position as described hereinabove. Because cover 134 is closely positioned in tubing 130, the valve plug cannot be pushed from its sealing position because of the cooperation and engagement between handle 78 and cover 134.

Because there is no tight fitting interrelationship between plug portion 62 and sleeve or collar members 48, no difficulty is encountered after removing cover 134 in moving valve plug 60 from a first blocking position with outlet opening 32 as shown in the FIGURES to a second blocking position with outlet opening 30. A close fitting relationship between these components could cause great difficulty in making the switch between the first and second blocking positions when desired due to sediment build-up, expansion and contraction and the like which could be encountered during the long periods of time in which the valve plug would remain in one of the blocking positions. Typically, such periods might be one year or more. If the valve plug becomes lodged in one of the blocking positions, it could be very difficult to remove it from that position without substantial effort and, possibly, the necessity of excavating in order to reach the valve housing itself.

In the preferred embodiment hereinabove described, there are disclosed two outlet openings 30 and 32 with a separate outlet box associated with each. The outlet boxes are formed in order that they may be received in a closely spaced position relative to each other but it is deemed to be within the scope and intent of the present invention to modify this arrangement as may be deemed necessary and/or advantageous. For example, it may be possible to enlarge the valve housing and include more than two outlet openings. In this event, it may also be necessary to modify the location and spacing of openings 146 in cover 134. It is also possible to design other configuration for the outlet boxes themselves. Again, by way of example, it would be possible to manufacture a single outlet box which would include an interior wall, partition or baffle for purposes of dividing the box into separate compartments to segregate effluent flowing thereinto from the outlet openings in the valve housing.

In addition, it is also possible to eliminate entirely the use of the outlet boxes and to employ the alternator valve A by itself. In such an arrangement, outlet lines 156, 158 would be affixed directly to outlet openings 30, 32 respectively. The outlet boxes are preferred, however, merely because they provide installation stability for the overall structure.

Figures 7, 8:
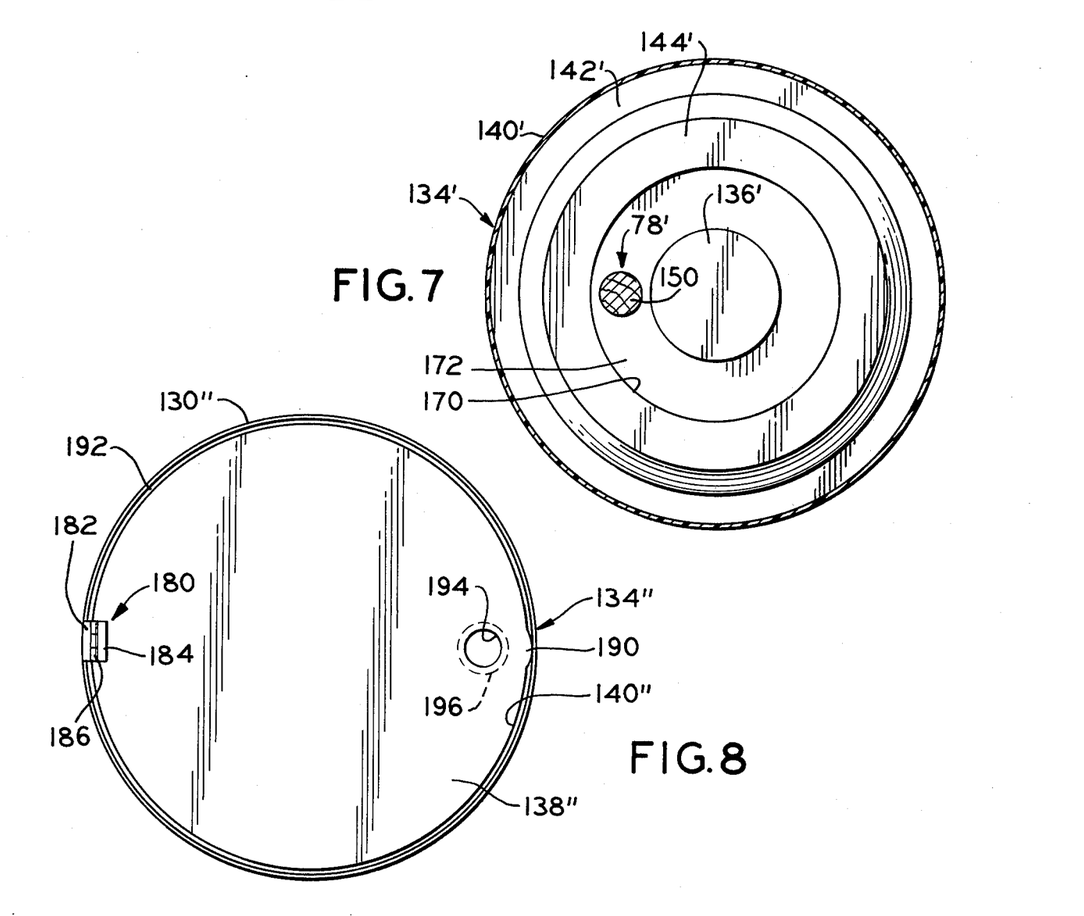

FIG. 7 shows a modified construction of the FIG. 6 cover. For ease of illustration in appreciating the modification, like components are identified by like numerals with a primed (') suffix and new components are identified by new numerals.

Accordingly, cover 134' has the same general configurations as cover 134. However, the plurality of openings 146 have been replaced by a circular groove 170 disposed in inner face 136' and located and dimensioned therein to receive the outermost end 150' of handle 78'. Groove 170 has a bottom wall 172 which generally corresponds to bottom walls 148 of openings 146. The groove arrangement eliminates any problems with having to align and locate an opening 146 in the cover of FIG. 6 with regard to handle 78.

FIG. 8 shows a still further modification for the cover insofar as it pertains to mounting the cover to the tube member. Here, like components are identified by numerals with a double primed (") suffix and new components are identified by new numerals.

In FIG. 8, cover 134" is affixed or connected to the top of tubing 130" by means of a hinge 180. This hinge includes a first portion 182 affixed by convenient means to the tubing, a second portion 184 affixed by convenient means to cover 134" and an intermediate hinge portion 186 permitting relative arcuate movement between portions 182, 184. Many types of hinge structures could be utilized which are constructed from different materials without departing from the scope and intent of the present invention.

Oppositely disposed from hinge 180 on cover 134" and extending outwardly from peripheral wall 140" is a protrusion 190 which may be conveniently integrally formed with the cover itself. This protrusion acts as a latch to retain the cover in position covering tubing 130". If cover 134" is molded from plastic, protrusion 190 may be such that it is slightly resiliently deformed when it engages the inner wall of tube member 130". Moreover, and in this arrangement, the components are dimensional so that there is a small clearance area 192 extending cirucmferentially around the structure between the inner wall of tubing 130" and peripheral wall 140" of the cover. This allows the cover to be selectively arcuately moved about hinge 180 between open and closed positions. Of course, other latching mechanisms may be employed within the scope of the present invention.

An opening 194 in outer surface 138", which is enlarged slightly beneath the outer surface, provides a convenient finger or tool receiving area to facilitate ease of opening the cover when desired. This enlarged area is designated 196 in FIG. 8.

The invention has been described with reference to the preferred embodiment with some possible modifications thereto. Obviously, other modifications and alterations will occur to others upon the reading and understanding of this specification. It is our intention to include all such modifications and alterations insofar as they come within the scope of the appended claims or the equivalents thereof.

Having thus described our invention, we now claim:

1. An alternator valve assembly adapted to be located some distance beneath a reference surface comprising in combination:

a housing having a continuous side wall, a bottom wall and a top wall defining a hollow valve chamber, said housing including an inlet opening and at least two spaced apart outlet openings communicating with said chamber from outside of said housing, said top wall having a valve plug receiving opening and said outlets each having a valve seat area disposed adjacent thereto in said chamber;

a valve plug receivable in said chamber through said plug receiving opening and movable through said receiving opening between separate blocking positions in said chamber for selectively blocking at least one of said outlets while allowing communication through said chamber between said inlet and the other of said outlets, said valve plug comprising a resilient body having a plug portion adapted to be received in said at least one outlet and a resilient sealing area adapted to sealingly engage the seat area associated with said at least one outlet;

an elongated handle having one end operatively communicating with said valve plug to extend outwardly therefrom and outwardly from said housing through said plug receiving opening when said plug is in a blocking position with the other end of said handle adapted to be disposed adjacent said reference surface;

means for defining a passage adapted to extend between said reference surface and said plug receiving opening in said housing top wall, said passage defining means being dimensioned to receive at least said handle therethrough; and, means for selectively closing said passage defining means adjacent said reference surface and including means positively cooperating with said handle other end to assist in maintaining said valve plug sealing area in sealing engagement with said at least one outlet seat area and to prevent dislodgement of said valve plug from a desired blocking position.

2. The combination as defined in claim 1 wherein said valve plug further includes an inner end portion having a cross-sectional dimension greater than the cross-sectional dimension of said plug portion and said outlets, said inner end portion including said sealing area.

3. The combination as defined in claim 2 wherein said sealing surface comprises a sealing lip disposed peripherally around said inner end portion and extending outwardly therefrom.

4. The combination as defined in claim 3 wherein said sealing lip is disposed adjacent the outer peripheral edge of said inner end portion and extends outwardly therefrom in generally the same direction as said plug portion, said plug portion having a cross-sectional dimension less than said outlets and adapted to be loosely received therein.

5. The combination as defined in claim 1 wherein said housing is formed substantially entirely of plastic and wherein each of said valve seats is disposed adjacent the juncture of the associated of said outlets and said chamber.

6. The combination as defined in claim 1 wherein said at least two spaced apart outlet openings are disposed in said housing bottom wall.

7. The combination as defined in claim 1 wherein said passage defining means comprises an elongated tubular member and said closing means comprises a cover for said tubular member adjacent said reference surface, said cover including said cooperating means therein.

8. The combination as defined in claim 7 wherein said cooperating means comprises at least one area therein for receiving said handle other end when said valve plug is in said separate blocking positions.

9. The combination as defined in claim 7 wherein said cover is hinged to said tubular member adjacent said reference surface to permit selected arcuate movement of said cover into and out of a covering relationship with said tubular member.

10. The combination as defined in claim 7 further including means for positively retaining said cover in a covering relationship with said tubular member.

11. The combination as defined in claim 1 further including an outlet box communicating with said at least two outlets of said housing and having an exit area associated with each of said outlets, said outlets including hollow sleeve members extending outwardly from said housing into communication with said outlet box.

12. The combination as defined in claim 11 wherein said at least two outlet openings are disposed in said housing bottom wall.

13. The combination as defined in claim 1 wherein each of said outlets includes an outlet box associated therewith, each said outlet box being comprised of a box housing having a continuous side wall, a top wall and a bottom wall defining an outlet box chamber.

14. In a valve assembly adapted to be located some distance beneath a reference surface wherein said valve includes a housing having a valve plug receiving opening in the top wall thereof; an inlet and at least one outlet and wherein a valve plug member is receivable in said housing through said receiving opening in a fluid blocking position with said at least one outlet, said valve plug member including a sealing area adapted to sealingly engage a seat area disposed in said housing adjacent said at least one outlet and wherein an elongated member having one end operatively communicating with said valve plug to extend outwardly therefrom through said housing receiving opening toward said reference surface when said valve plug is received in said fluid blocking position with said at least one outlet, the improvement comprising:

said elongated member being dimensioned so that the other end thereof is disposed adjacent said reference surface; means for defining a passage extending between said housing receiving opening and reference surface, said passage defining means being dimensioned to receive at least said elongated member therethrough; and, means for selectively closing said passage defining means adjacent said reference surface and including means for positively cooperating with said elongated member other end to assist in maintaining said valve plug sealing area in sealing engagement with the seat area of said at least one outlet and to prevent dislodgement of said valve plug from the desired fluid blocking position.

15. The improvement as defined in claim 14 wherein said passage defining means comprises an elongated tubular member and said closing means comprises a cover for said tubular member adjacent said reference surface, said cover including said cooperating means therein.

16. The improvement as defined in claim 15 wherein said cooperating means comprises at least one area therein for receiving said elongated member other end when said valve plug is in a blocking position with said at least one outlet.

* * * * *